United States Patent
Fricke et al.

(10) Patent No.: US 8,001,844 B2
(45) Date of Patent: Aug. 23, 2011

(54) HIGH TEMPERATURE PRESSURE SENSOR ELEMENT, PARTICULARLY FOR MEASURING PRESSURES INSIDE JET ENGINES, METHOD FOR THE PRODUCTION THEREOF AND COMPONENT FOR JET ENGINES

(75) Inventors: Soeren Fricke, Hoehenkirchen-Siegertsbrunn (DE); Gerhard Mueller, Grafing (DE); Alois Friedberger, Oberpframmern (DE); Eberhard Rose, Ebersberg (DE); Thomas Ziemann, Inning am Holz (DE); Ulrich Schmid, Saarbruecken (DE); Dimitri Telitschkin, Heilbronn (DE); Stefan Ziegenhagen, Bammental (DE)

(73) Assignee: Astrium GmbH, Munich (DE)

( * ) Notice: Subject to any disclaimer, the term of this patent is extended or adjusted under 35 U.S.C. 154(b) by 49 days.

(21) Appl. No.: 12/281,946

(22) PCT Filed: Mar. 1, 2007

(86) PCT No.: PCT/DE2007/000382
§ 371 (c)(1),
(2), (4) Date: Jan. 15, 2009

(87) PCT Pub. No.: WO2007/101426
PCT Pub. Date: Sep. 13, 2007

(65) Prior Publication Data
US 2009/0183573 A1    Jul. 23, 2009

(30) Foreign Application Priority Data
Mar. 7, 2006    (DE) .......................... 10 2006 010 804

(51) Int. Cl.
*G01L 13/02*    (2006.01)
(52) U.S. Cl. ............................................. 73/720; 73/726
(58) Field of Classification Search .................. None
See application file for complete search history.

(56) References Cited

U.S. PATENT DOCUMENTS

| | | | |
|---|---|---|---|
| 3,071,745 A | | 1/1963 | Stedman |
| 5,165,283 A | * | 11/1992 | Kurtz et al. ................. 73/727 |
| 5,406,852 A | | 4/1995 | Hiraka et al. |

(Continued)

FOREIGN PATENT DOCUMENTS

DE    693 06 019 T2    6/1997

(Continued)

OTHER PUBLICATIONS

The International Preliminary Report and Written Opinion with partial English translation (Fifteen (15) pages).

(Continued)

*Primary Examiner* — Andre J Allen
(74) *Attorney, Agent, or Firm* — Crowell & Moring LLP

(57) ABSTRACT

A high-temperature pressure sensor element for power units includes a substrate, in which an interior space is developed, a deformable membrane, which separates the interior space from the exterior space in order to deform when the exterior pressure changes, and a strain measuring element, which is arranged on the membrane, for measuring the deformation of the membrane. The substrate, the membrane, and the strain measuring element are manufactured from the same high-temperature-stable material, such as an alloy. By way of example a nickel base alloy may be used. A component for a power unit, such as a turbine blade for an airplane or rocket engine, includes an integrated high-temperature pressure sensor element of this type.

25 Claims, 2 Drawing Sheets

U.S. PATENT DOCUMENTS

| | | | |
|---|---|---|---|
| 6,058,782 A * | 5/2000 | Kurtz et al. ............... 73/727 |
| 6,189,205 B1 | 2/2001 | Moelkner et al. |
| 2004/0237659 A1 | 12/2004 | Mattmann |
| 2006/0283255 A1 * | 12/2006 | Tilak et al. ............... 73/705 |
| 2008/0011087 A1 * | 1/2008 | Kurtz ............... 73/708 |
| 2008/0011089 A1 * | 1/2008 | Friedl ............... 73/753 |
| 2008/0232745 A1 * | 9/2008 | Knobloch et al. ............... 385/88 |
| 2008/0297808 A1 * | 12/2008 | Riza et al. ............... 356/503 |
| 2009/0229368 A1 * | 9/2009 | Kurtz ............... 73/721 |
| 2010/0107771 A1 * | 5/2010 | Kurtz ............... 73/721 |

FOREIGN PATENT DOCUMENTS

| | | |
|---|---|---|
| DE | 196 44 830 C1 | 2/1998 |
| DE | 197 36 306 A1 | 3/1998 |
| DE | 103 37 571 A1 | 10/2004 |
| EP | 0 468 098 A2 | 1/1992 |
| EP | 0 561 397 A2 | 9/1993 |
| EP | 1 464 941 A1 | 10/2004 |
| FR | 2 057 215 A | 5/1971 |
| GB | 2 037 993 A | 7/1980 |

OTHER PUBLICATIONS

German Office Action dated Oct. 17, 2006 with partial English translation (Five (5) pages).

Otto J. Gregory et al., "High temperature stability of indium tin oxide thin films", Thin Solid Films 406 (2002) pp. 286-293.

Otto J. Gregory et al., "A self-compensated ceramic strain gage for use at elevated temperatures", Sensors and Actuators A 88 (2001) pp. 234-240.

International Search Report dated Jul. 16, 2007 w/English translation of pertinent portion (Five (5) pages).

German Office Action dated Oct. 17, 2006 (Three (3) pages).

Form PCT/ISA/220 and Form PCT/ISA/237 dated Jul. 16, 2007 (Seven (7) pages).

* cited by examiner

HIGH TEMPERATURE PRESSURE SENSOR ELEMENT, PARTICULARLY FOR MEASURING PRESSURES INSIDE JET ENGINES, METHOD FOR THE PRODUCTION THEREOF AND COMPONENT FOR JET ENGINES

BACKGROUND AND SUMMARY OF THE INVENTION

This invention relates to a high-temperature pressure sensor element, to a component for power units, and to a method of producing a high-temperature pressure sensor element. The high-temperature pressure sensor element is particularly suitable for measuring pressures inside power units.

Pressure sensors are used in different technological fields for measuring pressures of gases and liquids. In many cases, the pressure sensors are exposed to particularly high strain, which depends on the state of the medium in which the measuring of pressure takes place. The pressures acting upon the pressure sensor often vary considerably. A pressure sensor therefore has to withstand high strain while supplying precise measuring results.

Particularly with respect to measurements inside power units, for example jet engines of airplanes or rocket engines, the pressure sensor has to withstand very high temperatures and to have very low errors or measuring inaccuracies, despite extreme environmental conditions, which are subject to high fluctuations. This also applies to other uses, such as inside motors and other internal-combustion engines, etc.

A known pressure sensor has a membrane which deforms in the event of a pressure difference on both sides of the membrane. The deformation of the membrane is measured, for example, by piezo-resistive or piezo-electric elements arranged on one side of the membrane.

Particularly in the case of high temperature-caused strains, it is problematic when the membrane of the pressure sensor deforms or is distorted in its frame or its suspension. The results are inaccurate measurements or falsified measuring results, which occur particularly during large temperature fluctuations. Furthermore, with classical micromechanical silicon membranes, there is the problem of plastic deformation at high temperatures.

Housings frequently consist of metal with high thermal coefficients of expansion, while the sensor elements and their components are made of silicon, silicon carbide, ceramic materials or the like, with coefficients of expansion that are clearly less than those of metals. As a result, mechanical deformations occur during operation at high temperatures because of the different expansions, which deformations propagate onto the membranes. These thermally induced tensions falsify the measuring signals.

German Patent Document DE 196 44 830 C1 shows a pressure sensor having a housing with an interior that is closed by a membrane, and piezo-electric elements which generate a corresponding signal when the membrane is deformed. By way of an additional flexible measuring element, which is coupled to the membrane and with a deformation that is measured, the measuring results are not falsified by deformations of the membrane, and precise and reliable measurements can be carried out, even when the temperatures fluctuate considerably. However, solutions of this type have the disadvantage of relatively high constructive expenditures.

For measuring deformations at high temperatures, indium tin oxides, for example, are suitable, as described in the articles "High Temperature Stability of Indium Tin Oxide Thin Films", Otto J. Gregory et al., *Thin Solid Films* 406 (2002), 286-293, and "A Self-Compensated Ceramic Strain Gauge for Use at Elevated Temperatures", Otto J. Gregory, Q. Luo, *Sensors and Actuators* A88 (2001), 234-240.

It is an object of the present invention to provide a high-temperature pressure sensor that is suitable for measuring pressures at temperatures of up to far above 400° C., as they prevail, for example, in airplane engines, and, in the process, supply precise measuring results while extending service life. Furthermore, a method of producing such a high-temperature pressure sensor is to be provided.

The high-temperature pressure sensor according to the invention is particularly suitable for power units and comprises a substrate in which an interior is developed, a deformable membrane, which separates the interior space from the exterior space during operation and that deforms when the exterior pressure changes, and a strain measuring element, which is arranged on the membrane, for measuring the deformation of the membrane. The substrate, the membrane, and the strain measuring element are all manufactured of the same material.

By way of the invention, measurements of pressures can take place at temperatures far above 400° C., for example, at approximately 1,000° C. Furthermore, particularly at lower temperatures, the service life is extended in comparison with previously known pressure sensors. A pressure sensor according to the invention is therefore also particularly suitable for use in airplane and rocket engines. The high-temperature pressure sensor element has a particularly high temperature stability because the materials of the components are the same, and therefore deformations do not occur as a result of different coefficients of expansion. As a result, the strain measuring element, just on the basis of a temperature change of the sensitive layer, expands no differently than the substrate or the carrier and thereby causes no deformations.

According to the present invention, with the exception of the insulator layer, all components of the sensor element are produced from the same material, namely a high-temperature-stable metal alloy. In addition, the housing may also be made of this metal. As a result, thermally induced deformations are minimized. In addition, the high-temperature-stable metal alloy is resistant in many aggressive atmospheres and, also at a high temperature, is still elastic over a wide strain range. Furthermore, the specific resistance is only slightly dependent on the temperature. The high-temperature-stable nickel base alloy Haynes 230, used for power units and housings, is preferably used as a sputter target in order to use this material as a sputtered thin film for this micro-system-related use.

The components of the pressure sensor element and the housing are preferably made of the same material as a power unit wall into which the housing can be screwed.

The strain measuring element advantageously is a sensitive layer, and preferably is a strain gauge in the form of a thin-film strip conductor. This results in simplified, rapid, and cost-effective manufacturing.

The deformable membrane is constructed in one piece with the substrate. This results in an even more improved high-temperature stability and in lower deformations. It is an additional advantage that the high-temperature pressure sensor element can be produced by micromechanics techniques.

Advantageously, the high-temperature pressure sensor element is useable for integration in a turbine element, such as a turbine blade. This is a result of permitting the high-temperature pressure sensor element to be manufactured with an extremely small construction and to be used without a housing. For example, the interior of the substrate may only be completely closed because of the integration in the turbine blade or by way of a partial surface of the turbine blade.

It is also conceivable to hermetically close off the interior by a seal that is also manufactured from the same high-temperature-stable material and is connected with the substrate, for example, by welding, and in particular, by electron beam welding. As a result, a reference pressure can be generated behind the membrane or in the interior of the substrate, and the interior is evacuated.

Advantageously, an insulation layer, which is used for the electric insulation, is constructed between the membrane and the strain measuring element. The insulation layer is formed, for example, by BN, MgO, $Al_2O_3$, or a combination thereof.

The insulation layer is preferably applied to the membrane by sputtering. However, it can also be applied by a sol-gel process or by vapor depositing, and can be further optimized by oxidation or annealing.

Optionally, a passivation layer can also be applied over the strain measuring element, which layer consists of the same material and can be applied by the same method as the insulation layer. As a result, the service life of the strain measuring element is further increased.

The high-temperature pressure sensor element is advantageously used in a high-temperature pressure sensor for power units, particularly airplane and rocket engines. Even under very rough environmental conditions, the prevailing pressures can thereby be determined in a precise and reliable manner. In this case, the high-temperature pressure sensor element is particularly preferably integrated in a turbine blade.

According to one aspect of the invention, a method of producing a high-temperature pressure sensor has the steps of providing a substrate, applying an insulation layer to the substrate, applying a strain measuring element over the insulation layer, optionally applying a passivation layer made of the same material and by means of the same method as in the case of the insulation layer, and producing a deformable membrane from the partial area of the substrate. Subsequently, the strain measuring element is arranged on the membrane in order to measure a deformation of the membrane. The substrate, the membrane, and the strain measuring element are produced of the same high-temperature-stable material.

The deformable membrane is advantageously worked out of the substrate from its back, so that a recess is formed in the substrate.

The substrate can be shaped such that an interior space is developed on the back of the membrane, which interior space is hermetically closed off in the measuring operation.

The invention is illustrated by way of example in the drawings.

DETAILED DESCRIPTION OF THE INVENTION

Figure 1:
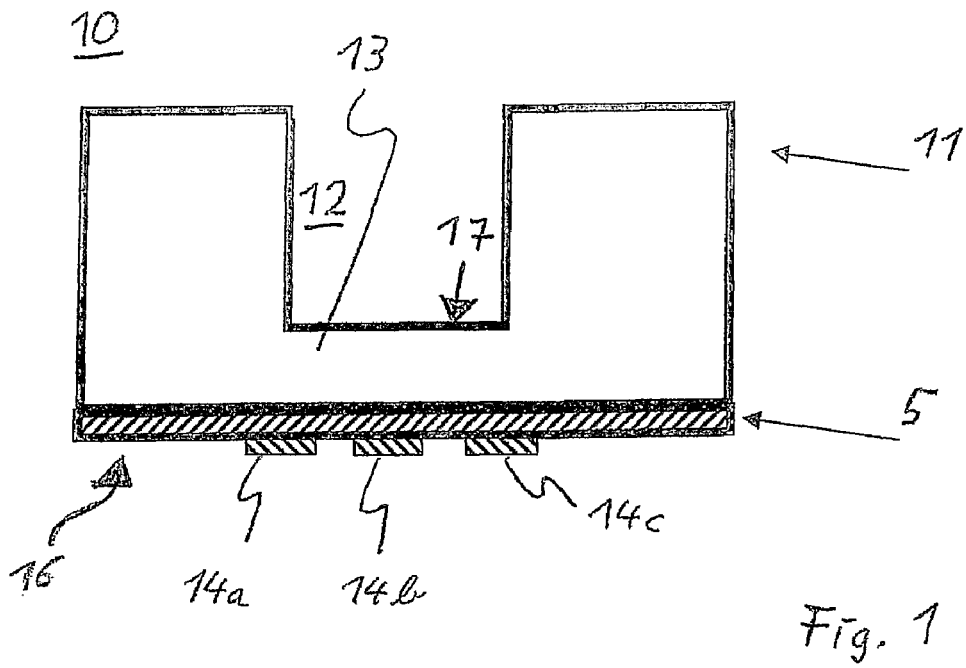
FIG. 1 is a view of a high-temperature pressure sensor element of the invention according to a first preferred embodiment.

FIG. 1 shows a high-temperature pressure sensor element 10 for measuring pressures above 400° C. The high-tempera-ture pressure sensor element 10 or the pressure sensor has a substrate 11 in which an interior space 12 is developed. Furthermore, a deformable membrane 13 is provided, which separates the interior space 12 from the exterior space during operation and deforms when the exterior pressure changes with respect to the pressure in the interior space 12. The interior space 12 is completely closed off during the operation of the sensor. An arrangement or structure of strain gauges 14a, 14b, 14c is arranged on the deformable membrane 13, which strain gauges 14a, 14b, 14c form a strain measuring element for measuring the deformation of the membrane 13. The membrane 13, the substrate 11 and the strain measuring element 14a, 14b, 14c are formed of the same high-temperature-stable material, preferably of an alloy, such as a nickel base alloy, for example, Haynes 230.

As a result, mainly also at high temperatures, low thermally induced tensions will occur, which lead to measuring errors because the various components do not have any different thermal coefficients of expansion. When materials of different coefficients of expansion are used, the material may fail as early as after a few temperature cycles.

The Haynes 230 nickel base alloy has the advantage that it is not only high-temperature-stable and resistant in many aggressive atmospheres but is also still elastic in a wide strain range at a high temperature.

An insulation layer 5 is arranged between the membrane 13 and the strain measuring element 14, 14b, 14c. As a result, the electrically conductive sensor element in the form of the strain measuring element 14a, 14b, 14c is electrically insulated from the membrane 13, which, in this preferred embodiment, is produced from an electrically conductive alloy.

In order to still more effectively avoid tensions thermally induced mainly at high temperatures, the insulation layer 5 has a relatively thin construction compared with the membrane 13. In this case, the insulation layer 5 should be made of a material with a thermal coefficient of expansion that is adapted as far as possible to that of the alloy or of the membrane 13 and of the substrate 11. Since a complete adaptation of the coefficient of expansion over the entire temperature range covered during the operation is hardly possible, because of the relatively narrow thickness of the insulation layer 5, thermally induced tensions are nevertheless largely avoided.

In the present example, the insulation layer 5 is formed of BN by sputtering. As a result, good insulation characteristics are obtained at high temperatures. Also conceivable are MgO or $Al_2O_3$, which are applied by sputtering, vapor depositing, or sol-gel processes, and which can be improved by subsequent oxidation or annealing. Combinations of the above-mentioned materials are possible.

Figure 2:
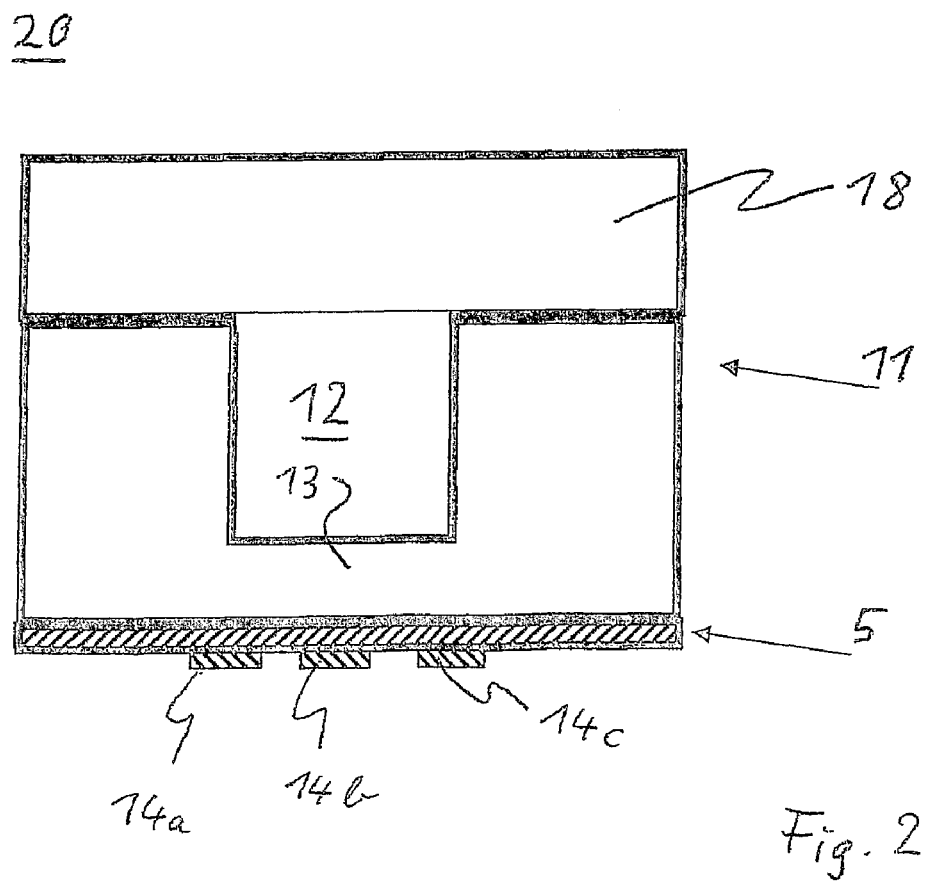
FIG. 2 is a view of a high-temperature pressure sensor element according to another preferred embodiment, which is closed by sealing.

The interior space 12 can be closed by applying a sealing 18 (see FIG. 2). Hermetic sealing takes place, for example, by electron beam welding. An already fully operational pressure sensor is obtained in this manner. However, apart from a direct integration, for example, in turbine blades, it is not used in this form, but is installed in a housing.

The substrate 11 and the membrane 13 are constructed in one piece; that is, the membrane 13 is formed by a partial area of the substrate 11, which has a corresponding shape in order to bound the interior space 12 toward the outside by means of the membrane 13.

In the present case, the strain measuring element 14a, 14b, 14c is further developed as a strain gauge in the form of a thin-film strip conductor. In the event of a deformation of the membrane 13, the strain measuring element 14a, 14b, 14c supplies a signal to an analysis unit because of a change of its electric resistance, which signal corresponds to the pressure applied on the outside.

According to this first preferred embodiment, the pressure sensor 10 is further developed for the integration into a turbine element, such as a turbine blade. However, the sensor may generally be integrated in components of any type in an environment in which the pressure is to be measured. In this case, the interior space 12 is closed or hermetically sealed off only by the integration into the turbine element, so that only the front 16 of the pressure sensor 20 bounds the exterior space in which the pressure is measured. For this purpose, the back of the interior space 12 is open and is enveloped by the substrate 11; that is, the interior space 12 forms a recess in the substrate 11. Because of the special shaping of the pressure sensor 10 by way of a single substrate 11, which forms the membrane 13, as well as by providing or enveloping the interior space 12 in the manner of a capsule, such a small construction is obtained that the pressure sensor can be completely integrated in components of a relatively small thickness, such as a turbine blade. The pressure sensor 10 of this first preferred embodiment can, however, also be installed in a separate pressure sensor housing and can thereby be bonded. In this case, the interior space 12 is sealed or hermetically closed off by the corresponding design of the housing.

When integration of the high-temperature pressure sensor element 10 into a turbine blade or into another power unit element is provided, the high-temperature-stable material of the pressure sensor element 10 is preferably the same as the material of the power unit element into which the sensor element or sensor housing is, for example, screwed.

During measurement of the pressure, a reference pressure is present in the interior space 12 on the back 17 of the membrane 13, so that the membrane 13 is deformed when the pressure changes that is applied from the outside.

Since the substrate (11), the membrane (13) and the strain measuring elements (14a, 14b, 14c) are manufactured of the same material, the sensor element 10 can be welded directly into a housing without having to use buffer layers, which operates to reduce the disadvantageous effects by different thermal coefficients of expansion.

FIG. 2 illustrates a high-temperature pressure sensor 20 according to a second preferred embodiment. The construction of the pressure sensor 20 corresponds to that of the above-described pressure sensor 10 according to the first embodiment. In this case, however, a sealing 18 is additionally arranged on the back of the substrate 11 so that it closes or hermetically seals the interior space 12. The sealing 18 is also made of the same high-temperature-stable material as the substrate 11 and is fixedly connected with the substrate 11 by welding. In this manner, a defined reference pressure, particularly a vacuum, can be provided in the interior space during the manufacturing. This creates a completely operational pressure sensor capsule, where all elements have very similar coefficients of expansion.

Figure 3:
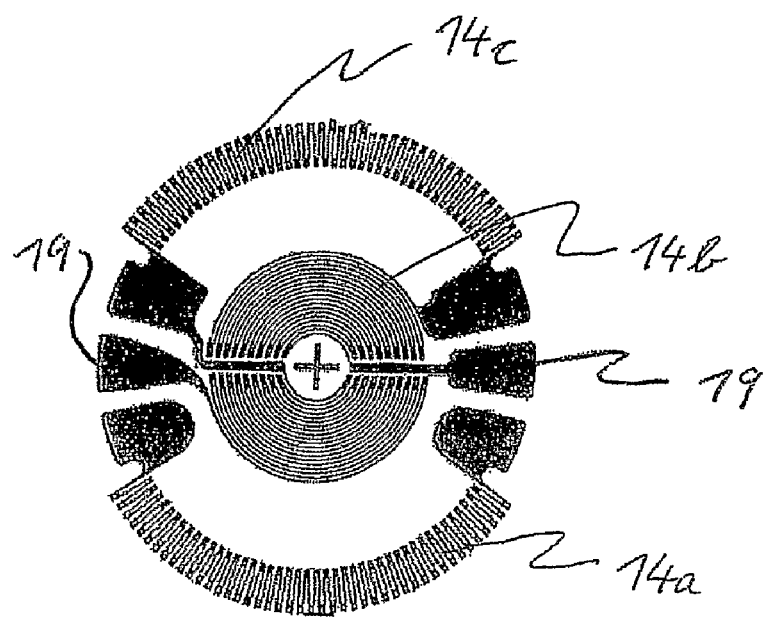
FIG. 3 is a view of an example of a strain measuring element which is or will be arranged on a membrane.

FIG. 3 illustrates an example of a strain gauge structure which is arranged as a strain measuring element on the membrane 13 of the pressure sensor 10, 20 according to the invention. The strain gauges 14a, 14b, 14c are further developed with a meandering shape and are arranged as thin-film strip conductors on the membrane 13 (see FIGS. 1 and 2). The shape of the strain gauge structure and its outer boundary essentially corresponds to the membrane surface 13; that is, the outer boundary having a round shape or the outer strain gauges 14a, 14c are arranged in the edge area of the membrane 13 on its top side, while the strain gauge 14b is situated in the center of the membrane 13.

For producing the high-temperature pressure sensor element according to the invention, first, a substrate is provided which is made of a high-temperature-stable material, in the present case an alloy, particularly a nickel base alloy. Subsequently, an insulation layer is applied to the substrate, for example, by deposition. A sensitive layer is applied to the insulation layer, which sensitive layer forms the strain measuring element 14a, 14b, 14c. The sensitive layer is applied by sputtering, the nickel base alloy being used as the sputtering target, from which the substrate 11 and the membrane 13 are manufactured and from which the housing can also be manufactured. Optionally, a passivation layer can additionally be applied over the strain measuring element, which passivation layer is made of the same material and by way of the same method as the insulation layer. As a result, the service life of the strain measuring element is further increased. The passivation layer is opened only in the area of the contact surfaces 19. Now, production of the membrane 13 takes place in the substrate, for example, from the direction of its back, by means of grinding, ultrasonic eroding, laser beam machining or electron beam vapor methods. In this case, the membrane is manufactured from a partial area of the substrate onto which the sensitive layer is applied as a thin-film strip conductor. As an alternative, the membrane can also be produced first and subsequently, the insulation layer and the sensitive layer can be applied.

Optionally, a platinum meander is additionally deposited on the substrate and is structured, which platinum meander forms a temperature sensor. The depositing and structuring of the platinum meander takes place away from the membrane, that is, outside the area in which the strain gauge structure is situated. The temperature sensor permits a temperature compensation which improves the measuring result even more, particularly at very high temperatures. The temperature compensation relates particularly to the temperature dependence of the gauge factor of the DMS (strain gauge). The temperature compensation is relatively simple with respect to the specific resistance because, in the case of the nickel base alloy Haynes 230, this specific resistance depends only slightly on the temperature.

The invention claimed is:

1. A high-temperature pressure sensor element for power units, comprising:
    a substrate, in which an interior space is developed,
    a deformable membrane, which separates the interior space from an exterior space so as to deform in operation when an exterior pressure changes, and
    a strain measuring element, which is arranged on the membrane, for measuring deformation of the membrane,
    wherein the substrate, the membrane, and the strain measuring element are manufactured from the same high-temperature-stable material.

2. The high-temperature pressure sensor element according to claim 1, wherein the high-temperature-stable material is an alloy.

3. The high-temperature pressure sensor element according to claim 2, wherein the alloy is a nickel alloy.

4. The high-temperature pressure sensor element according to claim 2, wherein the alloy is Haynes 230.

5. The high-temperature pressure sensor element according to claim 1, further comprising a housing that is also produced from the same high-temperature-stable material.

6. The high-temperature pressure sensor element according to claim 1, wherein the deformable membrane is constructed in one piece with the substrate.

7. The high-temperature pressure sensor element according to claim 1, wherein the strain measuring element is a strain gauge in the form of a high-temperature-stable thin-film strip conductor.

8. The high-temperature pressure sensor element according to claim 1, wherein the element is for integration in a turbine element.

9. The high-temperature pressure sensor element according to claim 8, wherein the turbine element is a turbine blade.

10. The high-temperature pressure sensor element according to claim 1, wherein the interior space is hermetically closed off by a sealing, which is also made of the same high-temperature-stable material.

11. The high-temperature pressure sensor element according to claim 1, further comprising an insulation layer, which is arranged to provide electric insulation between the strain measuring element and the membrane, and an optional passivation layer, which covers the strain measuring element made of the same material and is produced by the same method as the insulation layer.

12. The high-temperature pressure sensor element according to claim 11, wherein the insulation layer has a coefficient of thermal expansion which is adapted to the coefficient of thermal expansion of the high-temperature-stable material.

13. The high-temperature pressure sensor element according to claim 11, wherein the insulation layer is formed of Bn, MgO, $Al_2O_3$, or a combination thereof.

14. The high-temperature pressure sensor element according to claim 11, wherein the insulation layer is applied onto the membrane by sputtering, vapor depositing, or a sol-gel process.

15. Use of a high-temperature pressure sensor element according to claim 1 in a high-temperature pressure sensor for power units.

16. The high-temperature pressure sensor element according to claim 15, wherein the power unit is an airplane engine or a rocket engine.

17. A component for a turbine blade, comprising a pressure sensor element according to claim 1 integrated therein in order to measure the pressure of the turbine blade.

18. Use of a high-temperature pressure sensor element according to claim 1 in a power unit that is made of the same high-temperature-stable material or a nickel base alloy.

19. A method of producing a high-temperature pressure sensor element, comprising:
   providing a substrate,
   applying an insulation layer onto the substrate,
   applying and structuring a sensitive layer for forming strain measuring elements over the insulation layer, and
   producing a deformable membrane from a partial area of the substrate, so that subsequently the strain measuring elements are arranged on the membrane in order to measure a deformation of the membrane,
   wherein the substrate, the membrane, and the strain measuring elements are manufactured of the same high-temperature-stable material.

20. The method according to claim 19, wherein a high-temperature-stable nickel base alloy is used as a sputtering target in order to use this material as a sputtered thin film.

21. The method according to claim 20, wherein the alloy is Haynes 230.

22. The method according to claim 19, wherein the high-temperature pressure sensor element is a high-temperature pressure sensor element for power units, comprising:
   the substrate, in which an interior space is developed,
   the deformable membrane, which separates the interior space from an exterior space so as to deform in operation when an exterior pressure changes, and
   the strain measuring element, which is arranged on the membrane, for measuring the deformation of the membrane.

23. The method according to claim 19, wherein the deformable membrane is worked out of the substrate, from the direction of its back, so that a recess is formed in the substrate.

24. The method according to claim 19, wherein the substrate is shaped such that an interior space is further developed on the back of the membrane, which interior space is hermetically closed off during a measuring operation.

25. The method according to claim 19, wherein the sensor element is welded directly into a housing.

* * * * *